US011425896B2

(12) United States Patent
Kiefer et al.

(10) Patent No.: US 11,425,896 B2
(45) Date of Patent: Aug. 30, 2022

(54) OPEN-LOOP AND/OR CLOSED-LOOP CONTROL SYSTEM, AGRICULTURAL UTILITY VEHICLE, AND METHOD FOR THE OPEN-LOOP AND/OR CLOSED-LOOP CONTROL OF AN AGRICULTURAL UTILITY VEHICLE

(71) Applicants: Amazonen-Werke H. Dreyer GmbH & Co. KG, Hasbergen-Gaste (DE); Hydac Systems & Services GmbH, Sulzbach (DE)

(72) Inventors: Timo Kiefer, Saarlouis (DE); Georg Komma, Sankt Ingbert (DE); Patrick Krupp, Neuenkirchen (DE); Frank Grosse Prues, Bersenbrück (DE); Anna-Gret Borchert, Osnabrück (DE)

(73) Assignees: Amazonen-Werke H. Dreyer SE & Co. KG; HYDAC Systems & Services GmbH

( * ) Notice: Subject to any disclaimer, the term of this patent is extended or adjusted under 35 U.S.C. 154(b) by 240 days.

(21) Appl. No.: 16/491,809

(22) PCT Filed: Mar. 7, 2018

(86) PCT No.: PCT/EP2018/055587
§ 371 (c)(1),
(2) Date: Sep. 6, 2019

(87) PCT Pub. No.: WO2018/162545
PCT Pub. Date: Sep. 13, 2018

(65) Prior Publication Data
US 2020/0375171 A1   Dec. 3, 2020

(30) Foreign Application Priority Data
Mar. 8, 2017   (DE) .................... 10 2017 104 814.6

(51) Int. Cl.
*A01M 7/00* (2006.01)
*A01C 7/20* (2006.01)
*A01C 23/00* (2006.01)

(52) U.S. Cl.
CPC .......... *A01M 7/0057* (2013.01); *A01C 7/205* (2013.01); *A01C 23/007* (2013.01)

(58) Field of Classification Search
CPC .. A01M 7/0057; A01M 7/0053; A01M 7/005; A01M 7/00; A01C 7/205;
(Continued)

(56) References Cited

U.S. PATENT DOCUMENTS

| 5,988,528 A | 11/1999 | Krohn et al. |
| 2003/0052188 A1 | 3/2003 | Maliteare |
| 2016/0286780 A1 | 10/2016 | Leeb et al. |

FOREIGN PATENT DOCUMENTS

| DE | 102015104690 A1 | 9/2016 |
| EP | 2 829 177 B1 | 6/2016 |
| WO | 2006/052309 A2 | 5/2006 |

OTHER PUBLICATIONS

International Search Report dated May 28, 2018 in corresponding PCT Patent Application No. PCT/EP2018/055587.

*Primary Examiner* — Christopher J. Novosad
(74) *Attorney, Agent, or Firm* — Mintz, Levin, Cohn, Ferris, Glovsky and Popeo, P.C.

(57) ABSTRACT

An open-loop or closed-loop control system for an agricultural utility vehicle includes a distributor linkage for dispensing fertilizer, plant protection agent, or seed, and has a center part and two lateral extension arms connected by joints to the center part with a plurality of linkage sections (4) which can be folded relative to one another in a transport position and folded out relative to each other in a working position. The control system also has at least one sensor and a data processing unit configured such that signals of the (Continued)

sensor are processed so as to generate a control signal for the hydraulic device, and the hydraulic device can be controlled in order to set damping of vibrations occurring on the distributor linkage in a direction of travel.

23 Claims, 5 Drawing Sheets

(58) Field of Classification Search
CPC ......... A01C 23/007; A01C 7/201; A01C 7/20; A01C 7/00; A01C 23/00
See application file for complete search history.

OPEN-LOOP AND/OR CLOSED-LOOP CONTROL SYSTEM, AGRICULTURAL UTILITY VEHICLE, AND METHOD FOR THE OPEN-LOOP AND/OR CLOSED-LOOP CONTROL OF AN AGRICULTURAL UTILITY VEHICLE

Background of the Invention

The invention refers to an open-loop and/or closed-loop control system for an agricultural utility vehicle according to the preamble of patent claim 1. Furthermore, the invention refers to an agricultural utility vehicle according to claim 16, as well as a method for controlling an agricultural utility vehicle according to claim 17.

Such systems are used for agricultural vehicles for the application of materials such as fertilisers, plant protection agents or seeds. In order to spread the material efficiently and over a large area on the field soil to be worked, the agricultural utility vehicles have a distributor linkage with several spray nozzles. The distributor linkage extends transversely to the direction of travel and can have working widths of up to 40 m. The spray nozzles, which are mounted at regular intervals on the distributor linkage, are used for spreading the material on the ground to be worked. The distance between the distributor linkage and the ground should remain as constant as possible over the entire working width of the distributor linkage. This means that the distributor linkage is kept as parallel as possible to the ground to be worked.

As is well known, the distributor linkage has a centre part, for example a centrally located frame, and two lateral extension arms connected to the centre part, with several linkage sections, connected by joints, which can be folded in to one another in the transport position and folded out to the working position. The individual linkage sections can be pivoted about vertical axes via the corresponding joints and are mounted so that they can rotate about the respective vertical axis. By means of the fold-out linkage sections, the distributor linkage can thus be transferred from a space-saving transport position to a working position. The transport position describes the folded state of the distributor linkage. In contrast, the working position describes the condition of the distributor linkage in which all linkage sections are folded out. In other words, in the working position the distributor linkage has the entire working width and is in a completely horizontal starting position parallel to the ground.

When operating an agricultural utility vehicle with such a large working width, vibrations of the distributor linkage in or opposite to the direction of travel can occur, for example, due to driving over uneven ground, acceleration or braking of the utility vehicle. Due to such vibrations, very high forces can occur on the distributor linkage and homogeneous material output can no longer be guaranteed. It is therefore known, as an example from EP 2 829 177 B1, to arrange actuating and/or damping means between the centre part and the extension arm or between the linkage sections in such a way that on the one hand the distributor linkage can be transferred from a transport position into a working position and on the other hand damping of vibrations occurring on the distributor linkage can take place in the direction of travel. The positioning and/or damping means can be designed as hydraulically operating cylinders. As a result of vibrations of the distributor linkage, pressure differences arise in the hydraulic cylinders.

To control the damping of the vibrations, the positioning and/or damping means can therefore be controlled by a data processing unit. For this purpose, the data processing unit evaluates the signals from a plurality of sensors arranged on the distributor linkage for position and speed monitoring of the agricultural utility vehicle in order to generate a control signal for the hydraulic cylinders. The sensors, such as radar sensors or pulse generators, are used to determine the current type of movement of the agricultural utility vehicle, i.e. whether the utility vehicle is moving at a continuous speed or whether the utility vehicle is being accelerated or decelerated. The position of the distributor linkage can be monitored by means of an angle sensor.

For efficient material application and to avoid high mechanical loads on the distributor linkage, it is generally necessary to dampen vibrations as quickly as possible and independent of the type of movement of the agricultural utility vehicle. It is particularly desirable if the damping of the vibrations can be variably adjusted.

Summary of the Invention

The invention is therefore based on the object of providing a an open-loop and/or closed-loop control system for an agricultural utility vehicle, in which precise and variably adjustable damping of occurring vibrations in or opposite to the direction of travel can take place. The invention is also based on the object of providing an agricultural utility vehicle and a method for the open-loop and/or closed loop control of an agricultural utility vehicle.

This object is solved according to the invention by an open-loop and/or closed-loop control system comprising the features of claim 1. With regard to the agricultural utility vehicle, the object is solved by the subject matter of claim 16. Furthermore, with regard to the method, the object is solved by the subject matter of claim 17.

The invention is based on the idea of providing an open-loop and/or closed-loop control system for an agricultural utility vehicle, with a distributor linkage for applying material such as fertiliser, plant protection agent or seeds, which extends transversely to the direction of travel and has a centre part and two lateral extension arms connected to the centre part, with a plurality of linkage sections connected by joints which can be folded in to one another in the transport position and folded out to the working position. At least one hydraulic device is associated with each extension arm, whereby the distributor linkage can be transferred from a transport position to a working position. The system further comprises at least one sensor and a data processing unit which is configured such that the signals of the at least one sensor are processed and on the basis of which a control signal for the hydraulic device is generated, and the hydraulic device is controllable for adjusting the damping of vibrations occurring on the distributor linkage in the direction of travel. The sensor is designed in such a way that a pressure change occurring at the hydraulic device due to vibrations of the distributor linkage can be determined.

The invention has the advantage that the data processing unit can be used to variably adjust and/or re-adjust the damping of the vibrations occurring on the distributor linkage. This means that stronger damping can occur with strong vibrations of the distributor linkage and correspondingly lower damping with low vibrations of the distributor linkage. Here it is of particular advantage that the pressure change at the hydraulic device can be determined by means of the sensor. Since the pressure change that occurs is known, the data processing unit can adjust the damping immediately and directly to the pressure change that occurs. The damping of vibrations is therefore adjusted precisely and as quickly as possible, irrespective of the current operating status of the utility vehicle. Therefore, it is not necessary to draw conclusions about the occurring pressure change from other measurement data of otherwise designed sensors, or to calculate the pressure change from other measurement data, but the pressure change can be determined directly. As a result, the vibrations that occur can be efficiently counteracted. Due to the direct determination of the pressure change at the hydraulic device, interference effects or superimpositions of measurement errors, which can have a negative effect on the measurement signals of other sensors, are already compensated.

The data processing unit preferably has a control and/or evaluation program which processes and evaluates the signals of at least one sensor as an input variable and, based on this, can generate a control signal for the respective hydraulic device.

Preferred embodiments of the invention are indicated in the subclaims.

In a preferred embodiment of the invention, the sensor is designed in such a way that a pressure difference can be measured at the hydraulic device. Accordingly, the pressure change occurring can be measured directly and immediately by means of the sensor. This means that the data processing unit receives a directly measured value for the pressure difference as the input variable for setting the damping. The advantage of measuring the pressure difference is that an exact value of the pressure change occurring on the hydraulic device is already known, and therefore the data processing unit can adapt, adjust and/or re-adjust the damping to the pressure difference measured by the sensor as quickly and precisely as possible.

Furthermore, the sensor is preferably designed as a pressure sensor for direct pressure measurement, in particular as a pressure transducer. The design of the sensor as a pressure sensor has the advantage that both a relative pressure and an absolute pressure can be determined. Furthermore, the sensor can preferably be designed as a differential pressure transducer for determining a differential pressure or an occurring pressure difference. The design of the sensor as a pressure transducer is particularly suitable for the use of hydraulic devices. Advantageously, the pressure transducer can record the pressure to be measured via a measuring diaphragm, which is converted mechanically depending on the respective pressure. This mechanical change is measured electronically and output as an analogue output signal and transmitted to the data processing unit. Preferably two sensors are assigned to a hydraulic device. This can also be used to determine a differential pressure. This has the advantage that pressure differences can be determined as precisely as possible.

Alternatively, it is also conceivable to draw indirect conclusions about an occurring pressure change in comparison to direct pressure measurement at the hydraulic device by means of a pressure sensor. The position or angle of the linkage sections can for instance be measured by a potentiometer. The potentiometer determines whether a single linkage section or the entire extension arm is deflected from its horizontal position due to a vibration and how its position changes. In principle, this can also be used to infer a change in pressure due to the deflection. However, the direct determination of the pressure change or the measurement of the pressure difference has the advantage that a robust and solid measured value and thus a reliable input variable without interference effects can be provided for the data processing unit.

Particularly preferably, the hydraulic device comprises a hydraulic cylinder, in particular a double-acting hydraulic cylinder, a hydraulic line which is connected to the hydraulic cylinder for supplying hydraulic fluid, and at least one hydraulic valve unit for regulating the hydraulic pressure, the valve unit being controllable via an actuating signal of the data processing unit. In general, the use of a hydraulic fluid has the advantage that the friction within the hydraulic device is reduced and corrosion protection can be guaranteed at the same time. The hydraulic device can generally be designed as an actuator in order to convert the electrical control signals of the data processing unit into a mechanical movement and thus to transfer the distributor linkage from a transport position to a working position as well as to ensure the damping of vibrations occurring on the distributor linkage in the direction of travel. The hydraulic valve unit advantageously provides a safe and fast acting overload protection of the hydraulic cylinder. Overall, the hydraulic pressure on the hydraulic cylinder can be optimally adjusted using the hydraulic valve unit, which can be controlled by the data processing unit using a control signal.

In another preferred embodiment, the at least one hydraulic valve unit is formed by a proportional valve, in particular a 4-way valve. The hydraulic valve unit can, for example, also include a pressure control valve or other circuits for changing the hydraulic pressure in the hydraulic device.

Preferably, the respective hydraulic valve unit can be adjusted based on a measured signal from the sensor or an actual value determined otherwise. It is generally conceivable that, in addition to the at least one sensor to determine a pressure change occurring on the hydraulic device, further sensors are used in order to determine the position of an individual linkage section or of the extension arm of the distributor linkage and to indirectly conclude that a pressure change is occurring. The determination of the occurring pressure change at the hydraulic device allows a precise adjustment of the damping of occurring vibrations. The pressure change can be measured directly by means of the sensor, or otherwise and indirectly determined by other sensors.

In another preferred embodiment, further sensors are arranged on the distributor linkage to detect rotation about a hinged axis and/or position detection of the respective linkage section and/or extension arm. These sensors can advantageously be designed as potentiometers and determine the position of the distributor linkage and/or the individual linkage sections. The potentiometer determines whether a single linkage section or the entire extension arm is deflected from its horizontal position due to a vibration and how its position changes. The hinged axis, around which the extension arm folding is carried out, is preferably vertically oriented but has at least one vertical component. The position determination can, for example, be implemented by measuring the deflection of the hydraulic cylinder.

In a further embodiment, the hydraulic device is adjustable based on a measured signal of the sensor with respect to a pressure change occurring at the hydraulic device and taking into account a pressure offset occurring due to a pitch inclination of the agricultural utility vehicle and/or based on the measured signals of the sensors with respect to a rotation occurring about a hinged axis and/or position detection of the respective linkage section and/or extension arm. As an example, the measured signal of the sensor can be evaluated by the data processing unit with regard to a pressure change occurring at the hydraulic device, taking into account a pressure offset. An external force acting on the distributor linkage can be taken into account by considering a pressure offset. Such forces can occur, for example, in the case of pitch inclinations of the agricultural utility vehicle in or in the opposite direction to the direction of travel. Thus the hydraulic valve unit can be adjusted by the data processing unit based on a combination of the pressure offset and the measurement of the pressure change occurring. Alternatively or additionally the rotation of the hinged axis of the respective linkage section and/or extension arm can, for example, be determined by means of a potentiometer. The data processing unit can carry out a target/actual value comparison with regard to the hinged axis and, based on the control difference and in combination with the pressure offset and the measurement of the pressure change occurring at the hydraulic device, set the hydraulic valve unit. The combination of different measured values in the data processing unit allows a very precise adjustment of the hydraulic valve unit. Any measurement inaccuracies that may occur can also be compensated.

In total, the data processing unit can control or adjust the associated hydraulic valve unit of the hydraulic device for damping vibrations occurring on the distributor linkage based on the measured signal of the sensor or the current position of the linkage section or extension arm. It is generally conceivable to use the measured signals of the sensor also in a control system as target value and for the adaptation of a target value. The data processing unit can be configured, or in other words have such a control and/or evaluation program, that, based on the measured signal of the at least one sensor, a corresponding target value for the respective hydraulic device is determined as an input value for the control, and the hydraulic device is controlled or set to the target value in such a way.

The hydraulic valve unit can also preferably be electronically controlled using a known characteristic curve. The characteristic curve of the valve unit generally reflects the functional dependence of the output signal on the input signal. Ideally the output signal will change linear with the occurring pressure as input signal. The ideal characteristic curve would therefore be a straight line. The measured, or in other words the real characteristic curve of the hydraulic valve unit cannot be exactly linear, but even at the start and end point of the pressure range the output signals deviate from the respective ideal values. It is therefore of particular advantage for a precise adjustment of the damping of vibrations occurring on the distributor linkage to adjust the hydraulic valve unit on the basis of its characteristic curve and therefore to adapt to and counteract the pressure change that occurs. Using the pressure sensors as an example, the characteristic curve of the valve unit can be used to determine how large the required control current must be switched to the valve unit in order to counteract the pressure change that occurs.

In a further embodiment, the at least one hydraulic valve unit of the respective hydraulic device can be adjusted and/or re-adjusted independently of the data processing unit. This means that the hydraulic valve unit of the associated hydraulic device of the respective extension arm can be controlled independently of each other via an electronic signal from the data processing unit. Therefore, the open-loop and/or closed-loop control system can be used efficiently for both symmetrical and asymmetrical distributor linkages. It is advantageous that the hydraulic line connected to the respective hydraulic cylinder is connected to at least one hydraulic accumulator. It is conceivable that the open-loop and/or closed-loop control system comprises a central hydraulic accumulator or, alternatively, one hydraulic accumulator each is assigned to the right-hand or left-hand extension arm of the distributor linkage. The hydraulic accumulator advantageously generates the hydraulic pressure acting in the hydraulic cylinder.

Furthermore, two pressure sensors in the hydraulic line are preferably assigned to the respective hydraulic cylinder in such a way that both the applied pressure on a piston surface and on an annular surface of the hydraulic cylinder can be determined. Thus a precise pressure measurement at the hydraulic cylinder, or in other words a precise determination of the pressure difference occurring at the hydraulic cylinder due to vibrations of the distributor linkage can be made.

In another embodiment, the hydraulic devices assigned to the respective extension arm form a closed hydraulic circuit, whereby the hydraulic cylinders of the hydraulic devices are connected by a common hydraulic line. Ideally, this means that there is no need to attach individual separate hydraulic lines and the sensors for determining any pressure changes that occur on the hydraulic equipment can also be attached to the common hydraulic line.

Advantageously, a pressure sensor is arranged in the common hydraulic line in such a way that the pressure on the annular surface of all hydraulic cylinders can be determined. In this case the pressure on the annular surfaces of the hydraulic cylinders is at least approximately identical.

In a preferred embodiment, the data processing unit forms a unit with the at least one sensor and the at least one hydraulic device. This implies a direct connection, for example via cable lines or wirelessly, between the sensor and the data processing unit, as well as the hydraulic equipment. Therefore, the measuring signal acquired by the sensor can be transmitted efficiently and as quickly as possible to the hydraulic vibration damping device via a control signal of the data processing unit.

In the context of this application, an agricultural utility vehicle is also claimed for the application of material such as fertilisers, plant protection agents or seeds with a open-loop and/or closed-loop control system according to one of the preceding embodiments.

Furthermore, a method for the open-loop and/or closed loop control of an agricultural utility vehicle is disclosed within the scope of the present application, having a distributor linkage for dispensing material, such as fertiliser, plant protection agents or seeds, which extends transversely to the direction of travel and has a centre part and two lateral extension arms connected to the centre part and having a plurality of linkage sections connected by joints which can be folded in relative to one another in the transport position and folded out in the working position. At least one hydraulic device is associated with each extension arm, whereby the distributor linkage can be transferred from a transport position to a working position. The system further comprises a sensor and a data processing unit which is configured such that the signals of the at least one sensor are processed and on the basis of which a control signal for a hydraulic device is generated, and the hydraulic device is controlled for adjusting the damping of vibrations occurring on the distributor linkage in the direction of travel. The sensor detects a pressure change at the hydraulic device caused by vibrations of the distributor linkage. In particular, the sensor, in particular the differential pressure transducer, measures a pressure difference at the hydraulic device. Alternatively, the pressure difference at the hydraulic device can be determined by a plurality of sensors.

Furthermore, preferably based on a measured signal of the sensor or an otherwise determined actual value, the at least one hydraulic device is adjusted and/or adjusted by means of the data processing unit.

It is advantageous that the respective hydraulic devices of the extension arms are adjusted and/or re-adjusted independently of each other.

With regard to the advantages of the method for controlling an agricultural utility vehicle, reference is made to the advantages explained in connection with the open-loop and/or closed-loop control system.

Brief Description of the Drawings

The invention is explained in more detail below with reference to the attached schematic drawings. The embodiments shown are only examples of how the open-loop and/or closed-loop control system according to the invention can be designed and do not represent a final limitation.

Detailed Description

Figure 1:
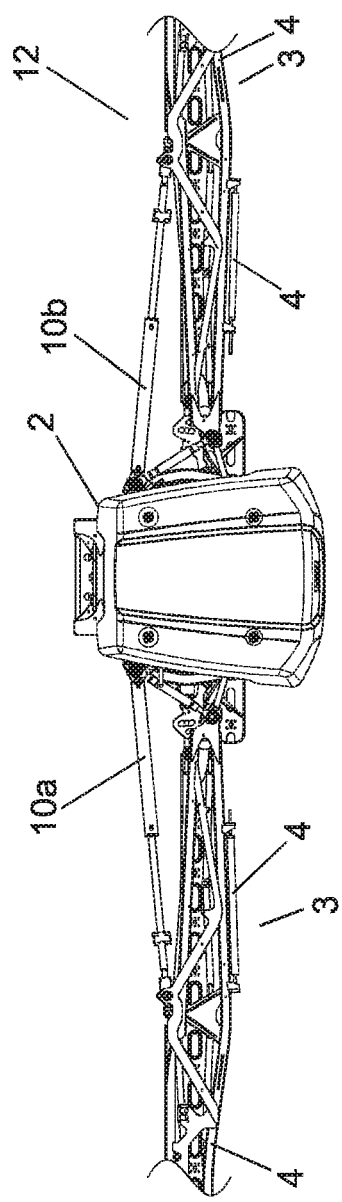
Figure 2:
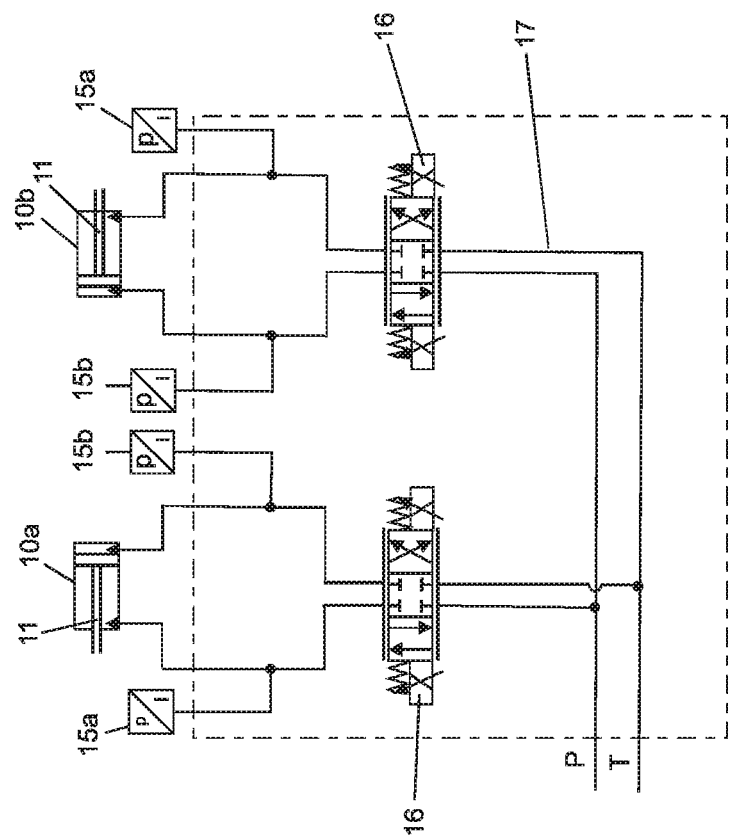
Figure 3:
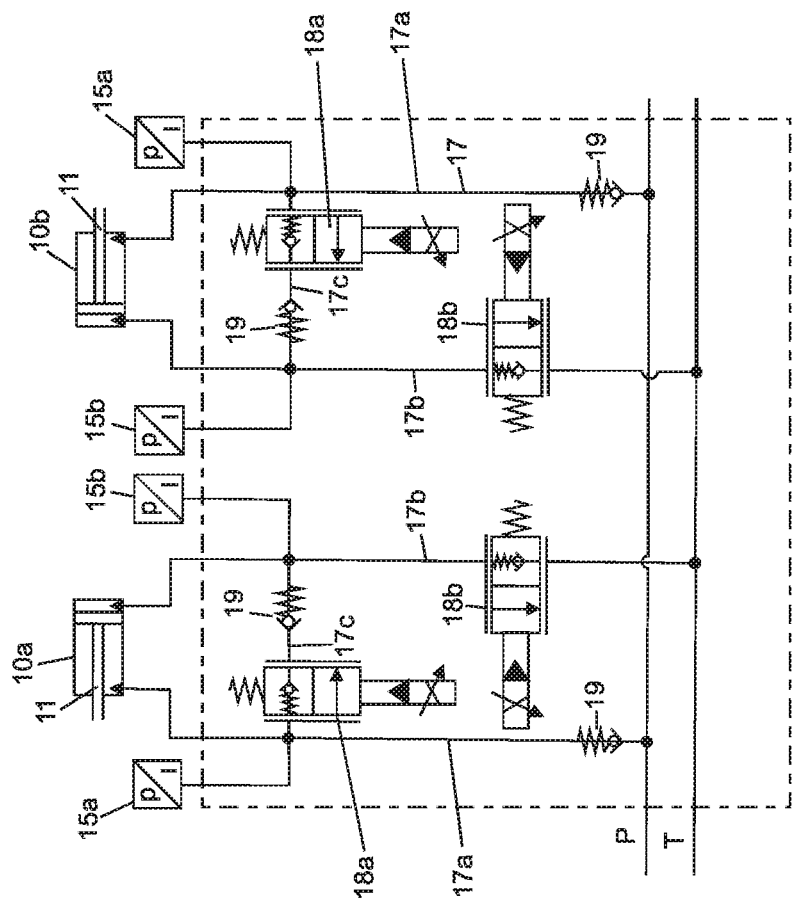
Figure 4:
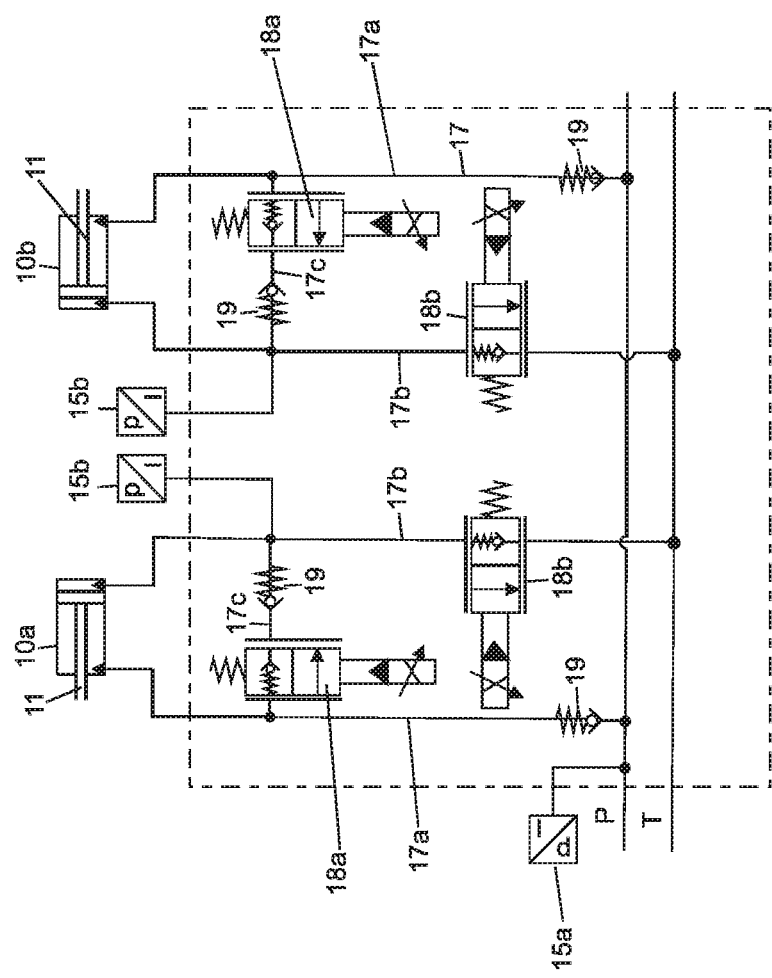
Figure 5:
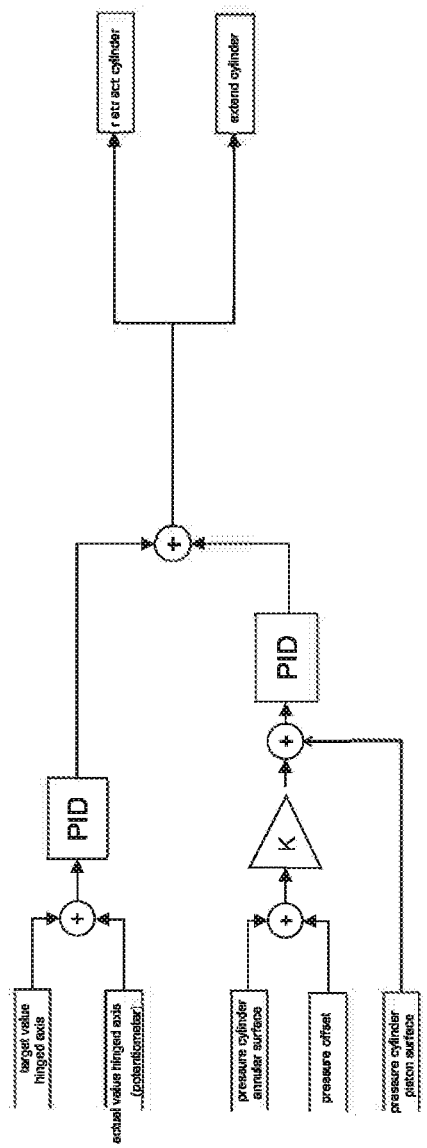

FIG. 1 shows a detailed perspective view of a distributor linkage with a open-loop and/or closed-loop control system according to the invention and with a centre part and two lateral extension arms connected to the centre part;

FIG. 2 shows a schematic diagram of a hydraulic circuit diagram for a open-loop and/or closed-loop control system according to the invention according to a first embodiment;

FIG. 3 shows a schematic diagram of a hydraulic circuit diagram for a open-loop and/or closed-loop control system according to the invention according to a further embodiment;

FIG. 4 shows a schematic diagram of a hydraulic circuit diagram for a open-loop and/or closed-loop control system according to the invention according to a third embodiment;

FIG. 5 shows a schematic diagram of a open-loop and/or closed-loop control system according to the invention according to a fourth embodiment;

FIG. 1 shows a detailed perspective view of a distributor linkage 12 with an open-loop and/or closed-loop control system for an agricultural utility vehicle according to the invention. The distributor linkage 12 is used for dispensing material such as fertiliser, plant protection agents or seeds and extends transversely to the direction of travel. The distributor linkage 12 has a centre part 2 and two lateral extension arms 3 connected by joints, connected to the centre part 2 with several linkage sections 4 which can be folded in to each other in transport position and folded out to the working position. The right and left extension arm 3 are each assigned a hydraulic cylinder 10a, b, which are connected to the centre part 2 and the respective extension arm 3. By means of the respective hydraulic cylinder 10a, b the respective extension arm 3 and thus the distributor linkage 12 can be transferred from a transport position to a working position. The hydraulic cylinders 10a, b fold the distributor linkage 12 via vertical axes into working and transport position.

In the area of the hydraulic cylinders 10a, b, sensors, which are not shown, for detecting the working position of the distributor linkage may be attached. For example, the sensors can be designed as potentiometers. This allows the position or working position of the piston rod of the hydraulic cylinder to be determined. A corresponding measurement or position signal can be transmitted via a data line to a data processing unit, which is not shown, which controls the folding operation of the linkage section based on the measurement signal. The data processing unit is configured in such a way that the signals from the sensors can be processed and used to generate a control signal for the hydraulic cylinders. Thus the folding out process of the distributor linkage can be detected by means of the potentiometers for position detection.

When the distributor linkage is in the working position, or in other words completely folded out, vibrations occurring on the distributor linkage can be damped by means of the open-loop and/or closed-loop control system via the hydraulic cylinders 10a, b and the distributor linkage 12 can be kept in its nominal position. The target position of the distributor linkage 12 is characterised by the fact that there is no relative movement between the utility vehicle carrying the distributor linkage and the distributor linkage itself, particularly in the direction of travel.

For this purpose, the open-loop and/or closed-loop control system comprises sensors, which are not shown, and are designed such that a pressure change occurring on the hydraulic cylinders 10a, b as a result of vibrations of the distributor linkage 12 can be determined. In particular, the sensors, which are preferably designed as pressure sensors, can be used to measure a pressure difference of 10a, b at the respective hydraulic cylinder. Based on the measurement signals of the pressure sensors, the data processing unit can actuate a hydraulic valve unit, which is not shown, by the respective hydraulic cylinder 10a, b, which is assigned to the data processing unit, whereby a pressure compensation and thus a damping of the occurring vibrations can be achieved.

FIGS. 2-4 show schematic diagrams of a hydraulic circuit diagram for a control system according to the invention. Different hydraulic circuit diagrams are shown as examples. It should be noted that other components may be present, but are not shown for the simple schematic arrangement in the Figures.

FIG. 2 shows a hydraulic circuit diagram for a hydraulic device according to an embodiment according to invention for the pressurisation of the right and left hydraulic cylinders 10a, b according to FIG. 1 for the transfer of the distributor linkage from a transport position into a working position and for setting the damping of vibrations occurring on the distributor linkage in the direction of travel. The right and left hydraulic cylinders 10a, b are examples of double-acting hydraulic cylinders. The hydraulic cylinders 10a, b are connected to the distributor linkage according to FIG. 1 as described above. The hydraulic cylinders 10a, b are connected to a hydraulic reservoir, which is not shown, via the hydraulic line 17. The hydraulic reservoir contains a hydraulic fluid which can be supplied to the respective hydraulic cylinder 10a, b via the hydraulic line 17. The hydraulic line 17 is formed by a pressure line, which in the Figures is marked with the reference numeral P, and a hydraulic reservoir line, which is marked with the reference symbol T.

Two pressure sensors 15a, b are assigned to each of the right and left hydraulic cylinders 10a, b. The two pressure sensors 15a, b are assigned to the hydraulic cylinder in such a way that both a pressure at a piston surface and a pressure at an annular surface of the hydraulic cylinder 10a, b can be determined. The hydraulic cylinder 10a, b has two different effective surfaces on the two sides of the piston 11. The effective surface of the hydraulic cylinder facing the piston rod is smaller than the effective surface facing away from the piston rod. Accordingly, the pressure sensor 15a measures a different, in particular smaller, pressure on the annular surface than the pressure sensor 15b on the piston surface.

The pressure sensors 15a, b are connected to a supply line 17a and a discharge line 17b of the respective hydraulic cylinder 10a, b to measure the pressure at the annular and piston surface of the hydraulic cylinder 10a, b. The supply line 17a of the hydraulic line 17 describes within the scope of the application that section of the hydraulic line 17 which connects the hydraulic reservoir, which is not shown, with the annular surface of the hydraulic cylinder 10a, b. In contrast, the discharge line 17b of the hydraulic line 17 describes the section of the hydraulic line 17 which connects the hydraulic reservoir with the piston surface of the hydraulic cylinder 10a, b.

The pressure sensors 15a, b are designed as pressure transducers. The pressure transducer is generally an electrical transducer for measuring the existing pressure in the hydraulic cylinder 10a, b. Thus a pressure change occurring due to vibrations of the distributor linkage can be determined by means of the pressure sensor. As an example, the pressure transducers 15a, b can be used to measure a pressure difference at the hydraulic cylinder 10a, b and thus at the hydraulic device.

Furthermore, each hydraulic cylinder 10a, b is assigned a hydraulic valve unit for controlling the hydraulic pressure. The hydraulic valve unit is arranged in the hydraulic line 17 and is designed as a proportional valve 16, or in other words as a multi-way valve. The pressure sensors 15a, b assigned to the respective hydraulic cylinder 10a, b are arranged on the feed line 17a and the discharge line 17b between the hydraulic cylinder 10a, b and the corresponding proportional valve 16. The proportional valve 16 is specially designed as a 4/3-way valve. The proportional valve 16 can be controlled and adjusted by a data processing unit that is not shown. For this purpose, the proportional valve 16 is connected to the data processing unit, for example via cable lines or wirelessly. The data processing unit is still connected to the pressure sensors 15a, b. Based on the signals determined by the pressure sensors 15a, b, the data processing unit can control the proportional valve 16. In particular, the proportional valve 16, which is assigned to the respective hydraulic cylinder 10a, b, can be actuated for pressure compensation based on the values determined by the pressure sensors 15a, b. In the rest position of the proportional valve 16, the valve is preferably closed, or in other words in a central position. The valve can be deflected to the left or right via the data processing unit. By the deflection of the valve, the pressure at the annular surface or the piston surface of the hydraulic cylinder can be increased or decreased by means of the proportional valve, or in other words, the piston of the hydraulic cylinder 10a, b can be retracted or extended.

The data processing unit, the pressure sensors 15a, b and the hydraulic valve unit 16 of the hydraulic device form one unit. Thus, based on the signals determined by the pressure sensors 15a, b, the data processing unit and the proportional valves for pressure compensation in the hydraulic cylinders 10a, b can be used to damp vibrations occurring on the distributor linkage.

FIG. 3 shows another schematic diagram of a hydraulic circuit diagram for an open-loop and/or closed-loop control system according to the invention according to a further embodiment. As described in FIG. 2 the right and left hydraulic cylinders 10a, b for folding the right and left hand extension arm 3 of the distributor linkage 12 according to FIG. 1 and for damping vibrations occurring on the distributor linkage 12 are exemplarily designed as double acting hydraulic cylinders 10a, b and connected with a hydraulic line 17. Two pressure sensors 15a, b are assigned to each hydraulic cylinder 10a, b to measure the hydraulic pressure at the annular and piston surface of the respective hydraulic cylinder 10a, b as described in FIG. 2.

In the respective feed line 17a of the hydraulic line 17 to the respective hydraulic cylinder 10a, b a shut-off valve 19 can be arranged between the hydraulic reservoir, which is not shown, and the respective hydraulic cylinder 10a, b. The hydraulic cylinder 10a, b can be connected to the hydraulic cylinder 10a, b by means of a check valve. The check valve 19 can be designed as a non-return valve and loaded with a spring. The flow can be blocked in one direction and released in the opposite direction by means of the check valve 19. Accordingly, hydraulic pressure can be continuously applied to the annular surface of the respective hydraulic cylinder 10a, b.

A multi-way valve 18b is arranged in the respective discharge line 17b of the respective hydraulic cylinder 10a, b. The pressure measurement of the hydraulic pressure with the pressure sensor 15b takes place between the hydraulic cylinder 10a, b and the multi-way valve 18b. The multi-way valve 18b can be controlled electronically via the data processing unit for pressure compensation based on the measuring signals of the pressure sensor 15a, b.

The feed line 17a and the discharge line 17b are connected by an additional intermediate line 17c. A further multi-way valve 18a is arranged in the intermediate line 17c. The multi-way valve 18a can be controlled electronically by means of the data processing unit. Furthermore, a check valve 19 can be arranged on the side of the multi-way valve 18a facing the discharge line 17b.

The two multi-way valves 18 a serve to connect the annular and piston surface of the respective hydraulic cylinder 10a, b. To extend the hydraulic cylinder 10a, b, the annular and piston surfaces are connected to each other, or the hydraulic cylinder extends over the proportionally larger surface of the piston surface. In other words, when the respective multi-way valve 18a is actuated by the data processing unit, the respective hydraulic cylinder 10a, b can extend.

The retraction of the respective hydraulic cylinder 10a, b can be achieved by means of the multi-way valve 18b assigned to the respective hydraulic cylinder 10a, b. When the multi-way valve 18b is actuated by the data processing unit, hydraulic fluid can be discharged on the piston side of the hydraulic cylinder 10a, b. Due to the continuous supply of the annular surface of the hydraulic cylinder 10a, b with hydraulic pressure, the hydraulic cylinder 10a, b can therefore retract.

Ideally, the ratio between the annular and piston surface should be 1:2 so that identical forces can be generated when the hydraulic cylinder 10a, b is retracted and extended. Thus, based on the values measured by the pressure sensors 15a, b, which are evaluated and processed by the data processing unit, the electronically controlled folding in and out of the two multi-way valves 18a, b, the folding in and out of the hydraulic cylinder 10a, b can be efficiently controlled.

FIG. 4 shows another schematic diagram of a hydraulic circuit diagram for an open-loop and/or closed-loop control system according to the invention according to a third embodiment. The basic design and function of the individual components of the hydraulic circuit diagram is as described in FIG. 3. In contrast to FIG. 3, only one single pressure sensor 15a is arranged in the hydraulic line 17 for measuring the pressure on the annular surface of both hydraulic cylinders 10a, b. Accordingly, the only pressure sensor 15a in the hydraulic line 17 is arranged between the hydraulic reservoir, which is not shown, and the respective feed line 17a of the respective hydraulic cylinder 10a, b. In other words, the only pressure sensor 15a is connected to the pressure line of the hydraulic line 17, which is marked in the Figures with the reference numeral P and comprises the supply line 17a. If the pressure on the annular side of the hydraulic cylinder 10a, b increases during operation, the hydraulic fluid inside the supply line 17a is pressed against the check valve 19. In other words, the hydraulic fluid column is supported on the check valve 19 and the actual pressure on the annular surface of the hydraulic cylinder 10a, b has a higher value than the pressure measured by the pressure sensor 15a. Consequently, the multi-way valve 18a or the multi-way valve 18b can be opened to equalize the pressure. Here the pressures in the pressure line and the annular surface of the hydraulic cylinder 10a, b are equalized, since in both cases hydraulic fluid can flow from the pressure line.

FIG. 5 shows a schematic diagram of an open-loop and/or closed-loop control system according to the invention according to a fourth embodiment. The schematic diagram illustrates here as an example a possible design of a control and evaluation program of a data processing unit according to invention according to FIG. 1. Measurement signals from a plurality of sensors, which can be arranged on the distributor linkage 12 according to FIG. 1, can be transmitted as input variables to the control and evaluation programme. For example, a potentiometer can be used to determine the actual value of rotation about the hinged axis of the associated linkage section 4 and/or extension arm 3, or in other words its deflection from the rest position, or the current position, and compare it with a target value. The difference or deviation between the actual value and the target value of the rotation around the hinged axis of linkage section 4 and/or extension arm 3 can be adjusted by means of a PID (proportional-integral-derivative) controller.

In addition, pressure sensors 15a, b arranged on the distributor linkage 12 can be used to determine the pressure on the annular surface and on the piston surface of a hydraulic cylinder 10a, b for transferring the distributor linkage 12 from a transport position to a working position and for damping vibrations occurring on the distributor linkage 12. In other words, pressure sensors 15 can be used to determine a pressure change occurring on the hydraulic cylinders 10a, b. When measuring the pressure at the annular surface, a pressure difference, which can be caused by an external force in the rest position of the distributor linkage 12, can already be compensated by its use as input variable for the control and evaluation program. This pressure difference, or pressure offset, can result, for example, from a pitching tendency of the agricultural utility vehicle in or opposite to the direction of travel. Such a pitch inclination of the utility vehicle can, for example, be taken into account by means of appropriately arranged sensors on the utility vehicle or via the map data of the field ground to be driven on. The ratio between the annular and piston surface of the hydraulic cylinder 10a, b can be determined more precisely by taking the pressure offset into account.

It is advantageous to consider the ratio between the annular and piston surface of the hydraulic cylinder 10a, b in order to compensate for the difference in surface between the two cylinder chambers of the hydraulic cylinder 10a, b. As an example, a pressure of 90 bar can be measured on the annular surface of the hydraulic cylinder 10a, b. The piston surface is usually larger than the annular surface by a factor K, for example by a factor of 2. Accordingly, there would be a greater pressure on the piston surface than on the annular surface, for example 180 bar. If the difference between the two values measured and corrected with the ratio of annular and piston surface taking into account the pressure offset, is equal to zero, the control and evaluation program will not output an output signal for an adjustment of the hydraulic cylinder 10a, b. Then the adjustment of the hydraulic cylinder 10a, b takes place only due to the regulation of the position of the linkage section 4 and/or extension arm 3. If the difference of the corrected pressures deviates from zero, an external force acts on the distributor linkage 12 and the control and evaluation program can output a control signal for the hydraulic cylinder 10a, b by means of a PID controller.

To generate the control signal for the hydraulic cylinder 10a, b, the signals of the potentiometer can be combined with the signals of the pressure sensors 15a, b. Depending on the system deviation, an output signal can be generated for the valve opening to set the hydraulic pressure at the hydraulic cylinder 10a, b on the basis of the characteristic curve of a hydraulic valve unit assigned to the hydraulic cylinder 10a, b. The characteristic curve can be used to determine a conversion for the valve current required for folding in and out or for retracting and extending the cylinder. Thus, based on the signals of the sensors, a precise control signal for the hydraulic cylinder 10a, b can be generated for damping vibrations occurring on the distributor linkage 12.

REFERENCE NUMERAL LIST 2 centre part
3 extension arm
4 linkage section
10a, b hydraulic cylinder left, right
11 piston
12 distributor linkage
13 centre part
15a, b pressure sensor
16 proportional valve
17 hydraulic line
17a supply line
17b discharge line
17c intermediate line
18a, b multi-way valve
19 check valve

The invention claimed is:

1. An open-loop or closed-loop control system for an agricultural utility vehicle, comprising:
a distributor linkage for applying material, the distributor linkage extending transversely to a direction of travel, and having a center part and two lateral extension arms connected by joints to the center part and having a plurality of linkage sections configured to be folded relative to one another in a transport position, and folded out in a working position,
wherein at least one hydraulic device assigned to each of the extension arms,
wherein the distributor linkage is configured to be transferred from the transport position into the working position,
wherein the control system has at least one sensor and a data processing unit which is configured such that measurement signals of the sensor are processed so as to generate an actuating signal for the hydraulic device,
wherein the hydraulic device is configured to be controlled so as to adjust damping of vibrations occurring on the distributor linkage in the direction of travel, and wherein the sensor is designed such that a pressure change occurring due to the vibrations of the distributor linkage is determined at the hydraulic device.

2. The system according to claim 1, wherein the sensor is designed such that a pressure difference is measured at the hydraulic device.

3. The system according to claim 1, wherein the sensor is a pressure sensor configured for direct pressure measurement.

4. The system according to claim 3, wherein the pressure sensor is a pressure transducer.

5. The system according to claim 1, wherein the hydraulic device comprises a double-acting hydraulic cylinder, a hydraulic line which is connected to the hydraulic cylinder for supplying hydraulic fluid, and at least one hydraulic valve unit for regulating hydraulic pressure, the valve unit being controllable via an actuating signal of the data processing unit.

6. The system according to claim 5, wherein the hydraulic valve unit is formed by a proportional valve.

7. The system according to claim 5, wherein the hydraulic valve unit is adjustable based on a measured signal of the sensor or a determined actual value.

8. The system according to claim 5, wherein the hydraulic valve unit is configured to be electronically controlled by a known characteristic curve.

9. The system according to claim 5, wherein the hydraulic valve unit of the hydraulic device is adjustable independently of the data processing unit.

10. The system according to claim 5, wherein the hydraulic line connected to the hydraulic cylinder is connected to at least one hydraulic accumulator.

11. The system according to claim 5, wherein two pressure sensors are assigned to the hydraulic cylinder in the hydraulic line so as to determine a pressure applied to a piston surface and to an annular surface of the hydraulic cylinder.

12. The system according to claim 5, wherein the hydraulic devices associated with the extension arms form a closed hydraulic circuit, the hydraulic cylinders of the hydraulic devices being connected by a common hydraulic line.

13. The system according to claim 12, wherein a pressure sensor is arranged in the common hydraulic line so as to determine the pressure on the annular surface of the hydraulic cylinder.

14. The system according to claim 1, wherein additional sensors are arranged on the distributor linkage for at least one of detecting rotation about a hinged axis and position detection of at least one of the linkage sections and the extension arms.

15. The system according to claim 14, wherein the hydraulic device is adjustable based on a measured signal of the sensor with respect to an occurring pressure change at the hydraulic device and taking into account at least one of a pressure offset occurring due to a pitch inclination of the agricultural utility vehicle, the measurement signals of the sensors with respect to an occurring rotation about a hinged axis, and position detection of at least one of the linkage sections and the extension arms.

16. The system according to claim 1, wherein the data processing unit forms a single unit with the sensor and the hydraulic device.

17. An agricultural utility vehicle for applying fertilizer, plant protection agents, or seeds, with the open-loop or closed-loop control system according to claim 1.

18. The system according to claim 1, wherein the material applied by the distributor linkage is at least one of fertilizer, plant protection agent, and seed.

19. A method for open-loop or closed loop control of an agricultural utility vehicle, comprising:
applying material, by a distributor linkage, the distributor linkage extending transversely to a direction of travel, and having a center part and two lateral extension arms which are connected to the center part and have a plurality of linkage sections connected by joints, which are configured to be folded relative to one another in a transport position, and folded out in a working position,
wherein at least one hydraulic device is assigned to each of the extension arms,
wherein the distributor linkage is configured to be transferred from a transport position into the working position,
wherein at least one sensor and a data processing unit are provided such that measurement signals of the sensor are processed to generate an actuating signal for the hydraulic device,
wherein the hydraulic device for adjusting damping of vibrations occurring on the distributor linkage in the direction of travel is actuated,
wherein the sensor determines a pressure change occurring on the hydraulic device as a result of the vibrations of the distributor linkage.

20. The method according to claim 19, wherein the hydraulic device is adjusted based on a measured signal from the sensor with respect to an occurring pressure change on the hydraulic device and taking into account at least one of a pressure offset occurring due to a pitch inclination of the agricultural utility vehicle, the measurement signals from the sensors with respect to an occurring rotation about a hinged axis, and position detection of at least one of the linkage sections and the extension arms.

21. The method according to claim 19, wherein the hydraulic devices of the extension arms are adjusted independently of one another.

22. The method according to claim 19, wherein the material applied by the distributor linkage is at least one of fertilizer, plant protection agent, and seed.

23. The method according to claim 19, wherein the sensor measures a pressure difference on the hydraulic device.

* * * * *